Patented Feb. 12, 1952

2,585,143

UNITED STATES PATENT OFFICE 2,585,143

LATEX FOAM STABILIZED WITH ETHYL ORTHOSILICATE AND AMMONIA

Elisha Betts Lewis, Dayton, Ohio, assignor to The Commonwealth Engineering Company of Ohio, Dayton, Ohio, a corporation of Ohio No Drawing. Application June 29, 1948,
Serial No. 35,966

12 Claims. (Cl. 260—2.5)

This invention deals with a method making sponge rubber and the product obtained thereby.

It has already been suggested to produce sponge rubber by foaming rubber latices with nitrous oxide gas or with air and curing said foam. These processes used heretofore have the disadvantage that the curing step has to be carried out immediately after the foaming step because otherwise the foam more or less collapses and thus impairs the porosity of the final product. This fact makes the operation of the previous processes rather delicate.

It is an object of this invention to provide a sponge rubber product whereby the disadvantage outlined above is eliminated.

It is thus an object of this invention to produce a rubber foam which is stable over a relatively long period of time, whereby the entire process of producing sponge rubber is considerably simplified, handling of the intermediate product made easier, and a more uniform final product is obtained.

These and other objects are accomplished by using a silicate as a foam stabilizer. While all kinds of silicates, inorganic and organic, may be used with advantage for the process of my invention, a mixture of ethyl ortho silicate with ammonium hydroxide plus an alkali silicate yielded the very best results.

The silicate solutions may be added to the latices either alone or in mixture with ammonium hydroxide. For instance, a mixture of equal amounts of ethyl ortho silicate and concentrated ammonium hydroxide gave very satisfactory results. The quantity of the silicate is not critical; however, an amount of about 5% of silicate by volume with regard to the latex volume has been found to be the preferred quantity.

The silicates are satisfactorily operative when foaming is carried out with air as well as with nitrous oxide gas. The stabilizer is preferably added after foaming has been carried out. When the silicate is admixed to the foamed latex, the foam experiences a slight depression in the beginning; however, after a certain decrease in volume has taken place, the foam remains stable. This initial depression of the foam, it has been found, increases the uniformity of the porous structure and thus is advantageous.

Natural as well as synthetic rubber latices are operative for the process of my invention. Especially good results were obtained with neoprene and with neoprene blended with styrene polymer or copolymer. These additional products increase the resiliency of the sponge.

It will be understood that the conventional auxiliary agents used in the rubber industry may be also employed in the process of my invention. Thus, for instance, alkyl acrylate emulsions may be added as latex extenders or diluents. Likewise plasticizers, foaming agents, gelling agents or dormant coagulants, wetting agents, and bodying or thickening agents may be employed in admixture with the latex.

In the following a few examples are given for compositions which have been found especially well suitable for the process of my invention; these examples are merely given by way of example but not for the purpose of limitation.

*Example I*

400 cc. neoprene, 140–22087
100 cc. acrysol, MR
8 cc. plasticizer, 30–1 American Anode Company
20 cc. foaming compound, 10–16 American Anode Company were added in the order given while air was mixed into this formula by stirring with a high speed. A foam was formed thereby which showed a final increase of volume of 300% with regard to the volume of latex used.

Thereafter a mixture of 20 cc. of ortho ethyl silicate and 20 cc. of concentrated ammonia were added and after this 9.2 cc. of sensitizer 40–2, which is sodium fluosilicate as sold by the American Anode Company. The resultant emulsion was poured into a hot dish and cured for 25 minutes under infra-red light and allowed to cool off over night. The sponge obtained was then washed in tap water, run through a wringer, and finally dried in an oven of a temperature of from 100 to 105° C. for two hours. The sponge pad obtained showed very uniform structure and a light color.

The latex compound 140–22087 referred to hereinbefore and hereinafter is a product of American Anode, Inc., of Akron, Ohio, and is a polymerized chloro-2 butadiene 1,3, comprising 53 to 54% solids. The latex contains 88% neoprene on the dry compound; 8% of the balance being zinc oxide, 2% Butyl Zimate (zinc dibutyl dithiocarbamate), and 2% phenyl beta naphthylamine; and the latex has the further following characteristics: a pH of 10.5–11.0; a viscosity #2 Zahn in seconds of 16–22; and a specific gravity of 1.13–1.16.

Acrysol MR is an aqueous anionic dispersion of an acrylic type polymer; it is of a milky white appearance and has a specific gravity of 1.07. The acrylic ester polymers are soluble in acetone and benzol and insoluble in sodium hydroxide and acrylic acids and soluble to the extent of about 6% in water. The solids content of the dispersion is approximately 50%.

The plasticizer 30–1 is a 100% castor oil.

The foaming compound 10–16 is a product of American Anode, Inc., of Akron, Ohio, and comprises 10% solids, which solids are Saponin. It is a water solution and compatible in any proportion with the latex.

Sensitizer 40–2 is a product of American Anode, Inc. of Akron, Ohio, and is a 25% dispersion of sodium silico fluoride.

*Example II*

400 cc. neoprene, 140–22087
100 cc. Merlon S
9 cc. potassium silicate (50% aqueous solution)
10 cc. plasticizer, 30–1
25 cc. foaming compound, 10–16 were mixed in the order given under high-speed stirring whereby a volume increase of 300% occurred and a foam was formed. Thereafter, still under stirring, 11.5 cc. sodium fluosilicate and then 20 cc. ethyl ortho silicate together with 20 cc. of concentrated ammonia and four drops of Tergitol 7 (sodium sulfate of 3,9-diethyl tridecanol-6) were added.

The foam thus obtained was eventually cured under infra-red light for 25 minutes. The sponge obtained showed uniform structure and no discoloration.

Merlon S a polymerized styrene is a product of Monsanto Chemical Company and contains 40% by weight of polystyrene resins dispersed in water. The styrene is 100% polymerized and the molecular weight of the polymer is approximately 100,000. The dispersion has a pH of 8–9 and a specific gravity of 1.03 and is of a milky white appearance.

All the products obtained by the examples given above showed excellent qualities with regard to color, structure, and resiliency. The process is not as delicate as it was heretofore due to the greater stability of the foam before and during vulcanization.

It will be understood that while there have been described herein certain specific embodiments of my invention, it is not intended thereby to have it limited to the details given in view of the fact that the invention is susceptible to various modifications and changes which come within the spirit of the disclosure and scope of the appended claims.

I claim:

1. In a process for manufacturing rubber sponge, the steps of (a) foaming a latex selected from the group of latices consisting of natural rubber and polymerized chloro-2 butadiene 1,3 by means of a gas; (b) admixing ethyl orthosilicate and ammonium hydroxide to said foam; and (c) curing said foam.

2. In a process for manufacturing rubber sponge, the steps of (a) foaming a latex selected from the group of latices consisting of natural rubber and polymerized chloro-2 butadiene 1,3 by means of nitrous oxide; (b) admixing ethyl orthosilicate and ammonium hydroxide to said foam; and (c) curing said foam.

3. In a process for manufacturing rubber sponge the steps of (a) foaming a latex selected from the group of latices consisting of natural rubber and polymerized chloro-2 butadiene 1,3 by means of air; (b) admixing ethyl orthosilicate and ammonium hydroxide to said foam; and (c) curing said foam.

4. In a process for manufacturing rubber sponge the steps of (a) foaming a latex selected from the group of latices consisting of natural rubber and polymerized chloro-2 butadiene 1,3 by means of a gas while stirring it; (b) admixing ethyl orthosilicate and ammonium hydroxide to said foam; and (c) curing said foam.

5. In a process for manufacturing rubber sponge the steps of (a) foaming a latex selected from the group of latices consisting of natural rubber and polymerized chloro-2 butadiene 1,3 by means of a gas while stirring it; (b) admixing 5% by volume of ethyl orthosilicate and 5% by volume of ammonium hydroxide each based on the volume of the latex; and (c) curing said foam.

6. In a process for manufacturing rubber sponge the steps of (a) foaming a latex selected from the group of latices consisting of natural rubber and polymerized chloro-2 butadiene 1,3 by means of a gas while stirring it; (b) adding a mixture of ethyl orthosilicate and concentrated ammonia to said foam; and (c) curing said foam.

7. In a process for manufacturing rubber sponge the steps of (a) foaming a latex selected from the group of latices consisting of natural rubber and polymerized chloro-2 butadiene 1,3 by means of a gas while stirring it; (b) adding a mixture of equal amounts by volume of ethyl orthosilicate and concentrated ammonia to said foam; and (c) curing said foam.

8. In a process for manufacturing rubber sponge the steps of (a) foaming a latex of a polymerized chloro-2 butadiene 1,3; (b) admixing an aqueous dispersion of a styrene polymer consisting of 40% by weight of polystyrene with said latex; (c) foaming the said latex by means of a gas while stirring the latex; (d) admixing ethyl orthosilicate and ammonium hydroxide to said foam; and (e) curing said foam.

9. In a process for manufacturing sponge rubber the steps of (a) foaming a latex selected from the group of latices consisting of natural rubber and polymerized chloro-2 butadiene 1,3 by means of a gas while stirring it; (b) admixing alkali silicate, ethyl orthosilicate and ammonium hydroxide to said foam; and (c) curing said foam.

10. In a process for manufacturing sponge rubber the steps of (a) foaming a latex of polymerized chloro-2 butadiene 1,3; (b) thereafter admixing an aqueous dispersion of a styrene polymer consisting of 40% by weight of polystyrene with the said latex; (c) foaming said latex by means of a gas while stirring the latex; (d) thereafter admixing an alkali silicate, ethly orthosilicate and ammonium hydroxide to said foam, and (e) curing said foam.

11. In a process for manufacturing rubber sponge the steps of (a) foaming a latex selected from the group of latices consisting of natural rubber and polymerized chloro-2 butadiene 1,3 by means of a gas while stirring it; (b) admixing ethyl orthosilicate and ammonium hydroxide to said foam; and (c) curing said foam for from 20 to 25 minutes under infra-red light.

12. A process of making rubber sponge comprising the steps of mixing under high speed stirring 400 cc. polymerized chloro-2 butadiene 1,3, having a solids concentration of 53–54% 100 cc. of an aqueous dispersion of polystyrene containing 40% by weight of said polystyrene, 9 cc.

potassium silicate (50% aqueous solution), 10 cc. of a castor oil plasticizer, and 25 cc. foaming agent having a solids concentration of 10%; thereafter adding, still under stirring, 11.5 cc. of a dispersion of sodium fluosilicate having a fluosilicate concentration of 25% and then 20 cc. ethyl orthosilicate together with 20 cc. of concentrated ammonia and four drops of sodium sulfate of 3,9-diethyl tridecanol-6; and curing the foam thus obtained under infrared light for 25 minutes.

ELISHA BETTS LEWIS.

REFERENCES CITED

The following references are of record in the file of this patent:

UNITED STATES PATENTS

| Number | Name | Date |
|---|---|---|
| 1,967,863 | Collins | July 24, 1934 |
| 2,432,353 | Talalay | Dec. 9, 1947 |
| 2,444,869 | Clayton | July 6, 1948 |
| 2,469,894 | Rogers | May 10, 1949 |

FOREIGN PATENTS

| Number | Country | Date |
|---|---|---|
| 298,628 | Great Britain | Aug. 22, 1929 |
| 338,698 | Great Britain | Nov. 27, 1930 |
| 529,246 | Great Britain | Nov. 18, 1940 |

OTHER REFERENCES

Bacon et al., Proceedings of Rubber Tech. Conference, London, 1938, pages 525-530.

Chemical Engineering, December 1947, page 180.

Cogan et al., pages 1364-1368, Ind. and Eng. Chem., Nov. 1947.